United States Patent [19]
Olsen

[11] 3,844,428
[45] Oct. 29, 1974

[54] TRAY STORAGE AND HANDLING SYSTEM FOR SCINTILLATION SPECTROMETERS AND THE LIKE

[75] Inventor: Robert E. Olsen, Glenn Ellyn, Ill.

[73] Assignee: Packard Instrument Company, Inc., Downers Grove, Ill.

[22] Filed: Apr. 7, 1972

[21] Appl. No.: 242,182

[52] U.S. Cl............ 214/301, 214/16.4 C, 214/310, 214/152
[51] Int. Cl.......................................... B65g 65/04
[58] Field of Search...214/16.1 CE, 16.1 CD, 16.4 C, 214/152, 301, 310; 221/11

[56] References Cited
UNITED STATES PATENTS

| | | | |
|---|---|---|---|
| 2,931,483 | 4/1960 | Gibbons | 214/16.4 C |
| 2,941,738 | 6/1960 | Burke et al. | 214/16.4 A |
| 2,967,633 | 1/1961 | Stegemann et al. | 214/309 |
| 3,240,365 | 3/1966 | King | 214/16.4 A |
| 3,406,638 | 10/1968 | Braun | 104/88 |
| 3,506,156 | 4/1970 | Hanson et al. | 221/11 |

*Primary Examiner*—Robert J. Spar
*Assistant Examiner*—Lawrence J. Oresky
*Attorney, Agent, or Firm*—Wolfe, Hubbard, Leydig, Voit & Osann, Ltd.

[57] ABSTRACT

A system for storing and handling a plurality of trays of sample vials which are conveyed past a transfer station where successive transverse rows of vials are transferred from the tray to an operating station and then returned to the tray. In the illustrative arrangement, the vials are transferred to a counting station where the radioactivity of the samples is measured. The system for storing and handling the trays includes a pair of vertically spaced, parallel conveyors each of which is adapted to support a plurality of trays. A pair of elevators at opposite ends of the two conveyors transfer the trays between the two conveyors, and reciprocating transfer arms on the conveyors transfer the trays between the elevators and the conveyors. The transfer arm on the lower conveyor also serves to index the trays past the transfer station, with the indexing movement being stopped each time a row of vials is transferred out of a tray located at the transfer station. Limit switches associated with the elevators and the transfer arms control the movement thereof. Each of the conveyors comprises a plurality of tray pallets which are continually cycled through the system regardless of whether a tray is contained in any given pallet at any given time.

23 Claims, 12 Drawing Figures

TRAY STORAGE AND HANDLING SYSTEM FOR SCINTILLATION SPECTROMETERS AND THE LIKE

The present invention relates generally to tray storage and handling systems and, more particularly, to systems for storing a plurality of sample vial trays and sequentially advancing such trays past a fixed transfer station.

It is a primary object of the present invention to provide an improved tray storage and handling system which is capable of storing a number of sample vial trays, typically nine or more, each containing a large number of sample vials, in a relatively small space, and which automatically advances said trays in sequence past a fixed transfer station.

A related object of the invention is to provide such an improved tray storage and handling system which is particularly useful for the feeding of trays of vials containing radioactive samples to a liquid scintillation spectrometer.

Another object of the invention is to provide an improved tray storage and handling system of the foregoing type which permits the user of the system to place trays of sample vials in the system at any desired time and then leave the trays unattended while they are automatically advanced in turn to a transfer station, where the sample vials may be transferred to a radioactivity counting station which produces a printed readout for example, after which the vials are returned to the trays and the trays automatically removed from the transfer station.

It is a further object of the invention to provide an improved tray storage and handling system of the type described above which includes a number of safeguards to ensure reliable operation so that the system can be left unattended without losing valuable test time. In this connection, a related object of the invention is to provide such a system which minimizes maintenance time and expense.

Still another object of the invention is to provide such an improved tray storage and handling system which can be efficiently manufactured at high production rates and at a relatively low cost.

Other objects and advantages of the invention will be apparent from the following detailed description taken in conjunction with the attached drawings, in which.

While the invention will be described in connection with a certain preferred embodiment, it will be understood that it is not intended to limit the invention to that embodiment. On the contrary, it is intended to cover all alternatives, modifications, and equivalents as may be included within the spirit and scope of the invention as defined by the appended claims.

Figure 1:
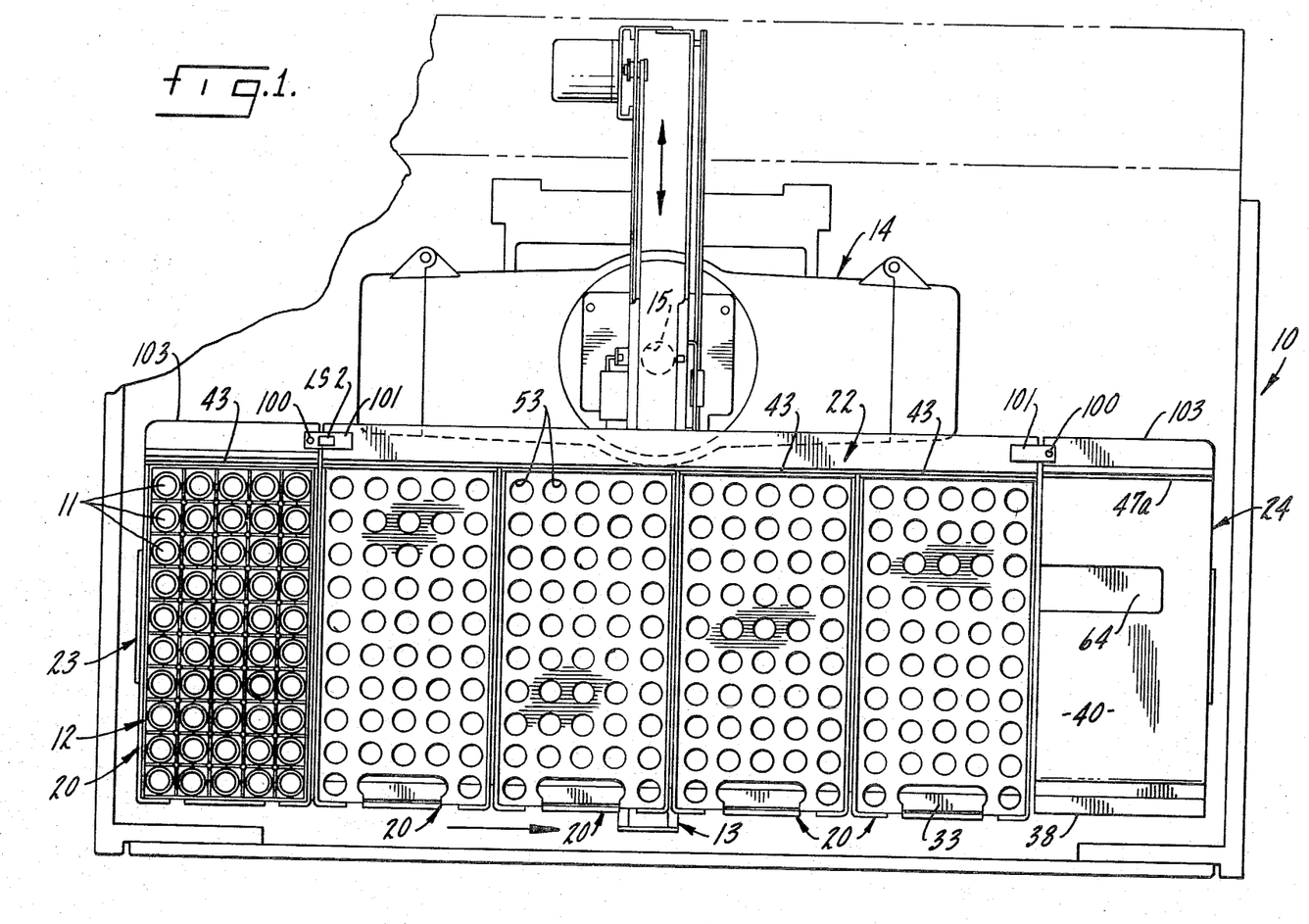
FIG. 1 is a top plan view of a scintillation spectrometer including a tray storage and handling system embodying the present invention.

Turning first to FIG. 1, there is shown a scintillation spectrometer 10 for use in measuring the radioactivity of a multiplicity of radioactive samples contained in individual vials 11 carried by a plurality of trays 12. In the particular arrangement illustrated each tray 12 is designed to hold 50 vials 11 in five rows, each containing 10 vials. The trays 12 serve to carry the sample vials past a transfer station 13 where the vials are removed, one row at a time, and transported laterally to a scintillation counting unit 14 having a vertical counting well 15. Each time a vial 11 is positioned over the well 15, that vial is lowered into the well where light scintillations induced in a scintillation medium by the radioactivity of the sample are converted to electrical pulses which are then analyzed and counted to provide a measurement of the sample's radioactivity. When all the samples in a given row have been counted, that row of vials is returned to the tray at the transfer station 13, and the tray is advanced to bring the next row of samples into alignment with the transfer station. By providing an automatic control system for indexing the sample trays past the transfer station 13, and for transferring successive rows of samples to and from the counting unit 14, a large number of samples can be automatically processed without requiring the attendance of an operator. Systems of this type are already commercially available and are described in the assignee's copending applications Ser. No. 27,406 filed Apr. 10, 1970 and Ser. No. 27,411 filed Apr. 10, 1970, now U.S. Pat. No. 3,722,719.

In accordance with one important aspect of the present invention, the capacity of the tray storage and handling system is greatly increased in a relatively small space by providing a plurality of parallel tray conveyors and automatic transfer means for transferring trays between the two conveyors. Thus, in the illustrative arrangement, a plurality of tray-carrying pallets 20 are supported for horizontal movement along two vertically spaced parallel tracks 21 and 22, and two elevator assemblies 23 and 24 are provided at opposite ends of the tracks for transferring the tray pallets 20 vertically between the two tracks. The transfer station 13 is aligned with the lower track 21, and each time a pallet is indexed past the station 13 it advances the leading pallet on the lower track 21 onto the platform of the left-hand elevator assembly 23. The two elevators are then raised simultaneously to the upper track 22 where the pallet on the left-hand elevator 23 is transferred onto the upper track, thereby advancing the leading pallet on the upper track 22 onto the platform of the right-hand elevator 24. The two elevators are then simultaneously returned to the lower track 21 where the pallet on the right-hand elevator 24 is transferred onto the lower track to complete one cycle of operation.

Figure 10:
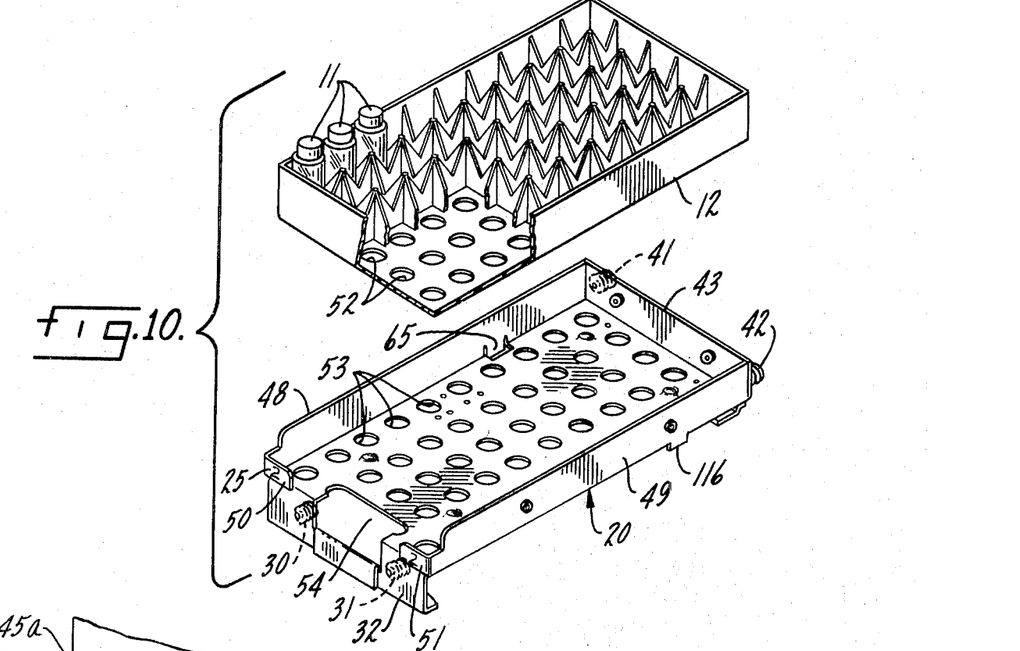
FIG. 10 is an exploded perspective of one of the tray pallets in the system of FIG. 1 and an exemplary tray carried by the pallet.

This cyclic movement of the tray pallets along and between the two tracks continues automatically as long as the spectrometer is energized, with the laboratory personnel or other users periodically removing trays of samples that have been counted and inserting trays of new samples into the system. Each pallet 20 is numbered, as illustrated at 25 in FIG. 10 and this number is automatically correlated with the data for samples carried by the respective pallets so the user can place his tray on any empty pallet in the system and leave unattended after noting the pallet number. If it is desired to count the samples in one tray ahead of another, the trays can be readily switched from one pallet to another, as long as a record is kept of the number of the pallet carrying each tray at the time it is indexed past the transfer station 13. While the invention is illustrated in a system designed to hold nine tray pallets, it will be understood that the invention is applicable to a system of any desired tray capacity.

Turning now to a more detailed description of the illustrative system, each of the pallets 20 is supported for horizontal movement along the tracks 21 and 22 by means of two pairs of rollers. The first pair of rollers 30 and 31 are journalled on a depending flange 32 on the front side of the pallet for rolling along a horizontal flange 33 on the frame section 34 forming the upper track 21, or a similar flange 35 on the frame section 36 forming the lower track 22. When the pallet is on one of the elevators 23 and 24, the front rollers ride on similar flanges 37 and 38 formed on the front edges of the platforms 39 and 40 of the left-hand and right-hand elevators 23 and 24, respectively. The second pair of rollers 41 and 42 are journalled on the rear side wall 43 of each pallet and ride on rails 44 and 45 at the rear of the upper and lower tracks 22 and 21, respectively, and on similar rails 46 and 47 at the rear of the two elevator platforms 39 and 40, respectively. To fix the horizontal position of the pallet, the rear rollers 41 and 42 are grooved to mesh with the rails 44–47, and flanges 44a, 45a, 46a or 47a project forwardly over the respective rails 44–47 just above the tops of the rollers 41 and 42 for the purpose of holding the rollers in meshing engagement with their rails.

In order to hold the trays 12 in position on the pallets 20, each pallet includes not only the rear upstanding side wall 43 but also left and right side walls 48 and 49 and a pair of inturned flanges 50 and 51 on the front ends of the side walls 48 and 49. Thus, the pallet engages all four sides of a tray placed thereon, so that holes 52 formed in the bottoms of the trays are always in register with corresponding holes 53 formed in the bottoms of the pallets; these holes 52 and 53 provide access to the sample vials within the tray from the bottom thereof so that the vials can be raised and lowered relative to the tray 12 by means of tines as described in the aforementioned copending application Ser. No. 27,411. At the front edge of each pallet, both the bottom wall and the flange 32 depending therefrom form a cutout 54 to facilitate gripping the front side of the tray 12 as it is placed on, or removed from the pallet 20.

Figure 4:
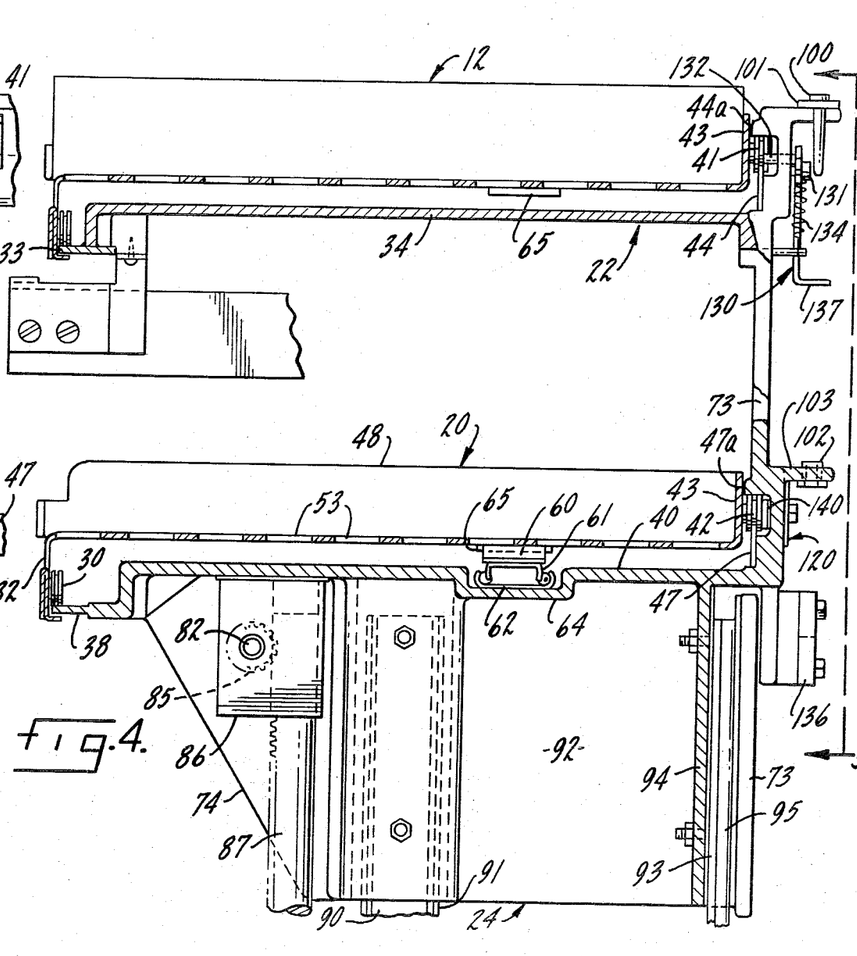
FIG. 4 is an enlarged section taken along line 4—4 in FIG. 2 with fragments of the structure above the elevator broken away.

For the purpose of transferring pallets from the right-hand elevator 24 onto the lower track 21, and thereby advancing all the pallets along the lower track 21, a transfer arm 60 (FIGS. 2, 4, 6, 10) is mounted for reciprocating movement back and forth along a limited path at the righthand end of the lower track 21. The transfer arm 60 is a plate of spring steel fixed at its right-hand end to the top member 61 of a ball slide of the type described, for example, in U.S. Pat. No. 3,205,025. The bottom member 62 of the ball slide, which is telescoped over the top member 61 with ball bearings (FIG. 4) therebetween, is secured to the lower track frame section 36 so that the top member 61 can be reciprocated back and forth over the fixed bottom member 62. The entire length of the ball slide is received in a longitudinal recess 63 formed in the top surface of the frame section 36, and a similar recess 64 is formed in the platform 40 of the adjacent elevator to receive the top slide member 61 when it is moved to its right-hand position where it is cantilevered over the platform 40.

Figure 11:
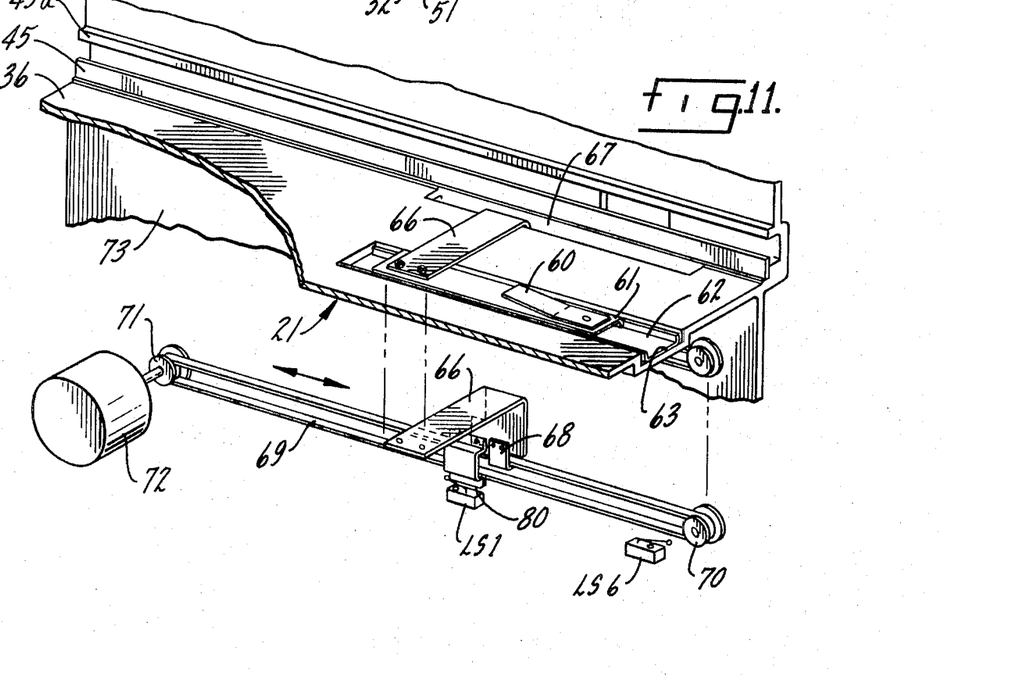
FIG. 11 is a perspective of the transfer arm assembly on the lower track of the system of FIG. 1, with the drive mechanism for the transfer arm shown in exploded position.
Figure 12:
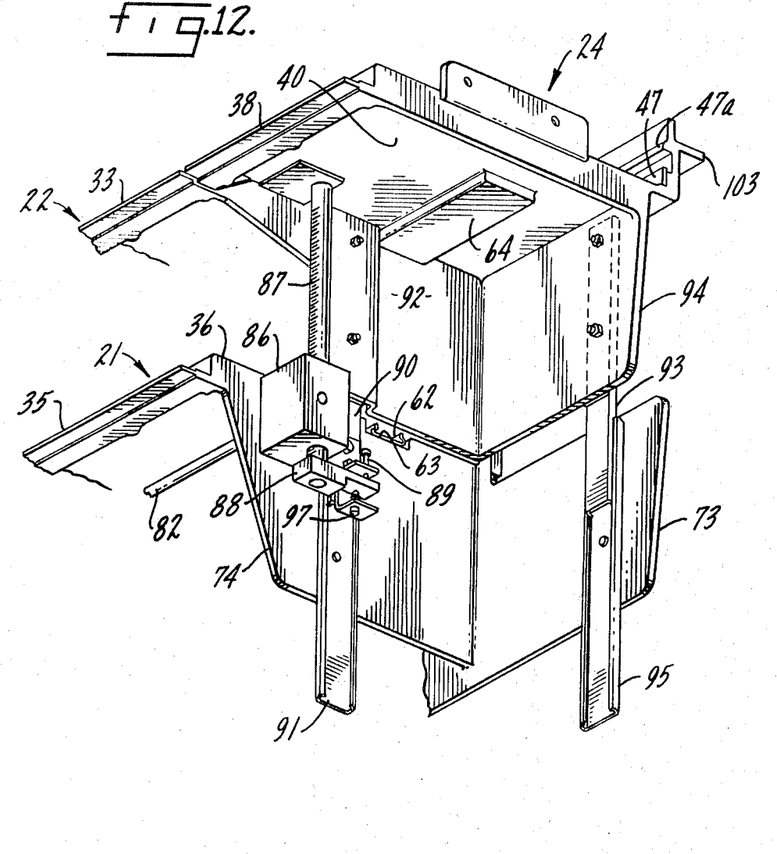
FIG. 12 is a perspective of the right-hand elevator assembly in the system of FIG. 1 with the elevator in its raised position.

As can be seen most clearly in FIG. 11, the left end of the transfer arm 60 is bent upwardly away from the slide member 61 so that the arm 60 is biased upwardly against the bottom surfaces of the pallets 20 positioned thereover. When the arm 60 is advanced to the right, with the elevator 24 in its lowered position, the free end of the arm is cammed downwardly by a short lug 65 punched out of the bottom wall of the pallet in line with the leading side wall thereof. As the arm 60 clears the lug 65, it snaps up behind the lug 65 so that when the direction of movement of the arm 60 is reversed, i.e., when it moves to the left, it pushes the pallet 20 off the elevator platform 40 onto the lower track 21.

For driving the transfer arm 60 between its advanced position and its retracted position the movable slide member 61 is fastened to a bracket 66 (FIGS. 2 6, and 11) which extends back to the rear of the track 21 and then down through a slot 67 in the frame section 36. Beneath the track 21, the bracket 66 is connected via fastener 68 to a motor-driven belt 69 passed around an idler 70 and a drive pulley 71. The pulley 71 is driven by a small reversible servomotor 72 mounted on the rear wall 73 of the track frame, thereby driving the transfer arm 60 back and forth between its advanced and retracted positions.

When the servomotor 72 is energized to move the transfer arm 60 from right to left, i.e., when the arm 60 is pushing a pallet 20 from the elevator 24 onto the lower track 21, the motor 72 is controlled by an indexing system of the type described in the aforementioned copending application Ser. No. 27,411, now U.S. Pat. No. 3,722,719. The indexing system senses the presence or absence of one or more sample vials in each row of tray compartments brought into alignment with the transfer station 13 and, if one or more vials are present, the servomotor 72 is de-energized and the vial transfer system is energized to transfer the vial or vials to the counting unit 14. Thus, movement of the transfer arm 60 from its advanced position to its retracted position is discontinuous when the tray being pushed past the transfer station 13 contains one or more sample vials.

Each time the transfer arm 60 reaches its retracted position, the leading pallet 20 on the lower track 21 is advanced completely off the track 21 and onto the left-hand elevator 23. At this point an actuator 80 driven by the belt 69 actuates a limit switch LS1 to de-energize the servomotor 72 and at the same time energize a second reversible servomotor 81 which drives the two elevators 23 and 24 up and down. The two elevators 23 and 24, which are mirror images of each other, are connected to the drive motor 81 via a common shaft 82 that is driven by a belt 83 passed around a pulley 84 on the shaft of motor 81. At each end of the common shaft 82, it carries a pinion gear 85 journalled inside a pinion block 86 affixed to a stationary end plate 74 formed as an integral part of the track frame. It will be appreciated that a separate pinion gear 89 and pinion block 86 is associated with each of the two elevators 23 and 24, but since the two elevators have identical structures, identical parts thereof have been identified by the same reference numbers.

As the pinion gears 85 are turned in response to energization of the elevator drive motor 81 by the limit switch LS1, racks 87 extending upwardly through vertical holes formed in the pinion blocks 86 are raised. This raises the elevators because the lower ends of the racks 87 carry brackets 88 which abut the lower ends of pins 89 carried by the movable members 90 of a pair of ball slides having their stationary members 91 fixed to the end plates 74. The movable members 90 are secured to depending end walls 92 of the elevator platforms so that movement of the members 90 moves the entire elevator assemblies. Consequently, raising of the racks 87 raises both elevators. To further guide and stabilize the elevators, a second pair of ball slides are mounted on the rear walls thereof, with the movable members 93 thereof secured to depending rear walls 94 of the elevator platforms and the stationary members 95 secured to the rear wall 73 of the track frame.

As the elevators 23 and 24 are raised, it is important that they be brought into accurate alignment with the upper track in both the horizontal and vertical directions to ensure reliable transfer of the pallets 20 between the elevators and the tracks 21 and 22. Alignment in the horizontal plane is ensured by means of taper pins 100 depending from plates 101 mounted on the rear corners of the track frame and extending laterally therefrom. As the elevator is raised, the pins 100 fit into bushings 102 threaded into rearwardly projecting flanges 103 on the elevator platform so that the tapered sidewalls of the pins serve as cams to accurately position the elevators in the horizontal plane during the final upward movement of the elevators. Alignment in the vertical direction is ensured by abutment of the tops of the bushings 102 against the undersides of the plates 101, thereby providing a positive stop for the upward movement of the elevators. In the particular arrangement illustrated, the elevator drive motor 81 is continuously energized while the elevators are located at their raised positions, with upward movement of the elevators being limited solely by the positive stop afforded by the plates 101. This positive stop stalls the drive motor 81, but the continuous energization of the drive motor 81 provides a positive biasing force which holds the elevators up against the plates 101 to assure accurate vertical positioning of the elevators.

Figures 8, 9:
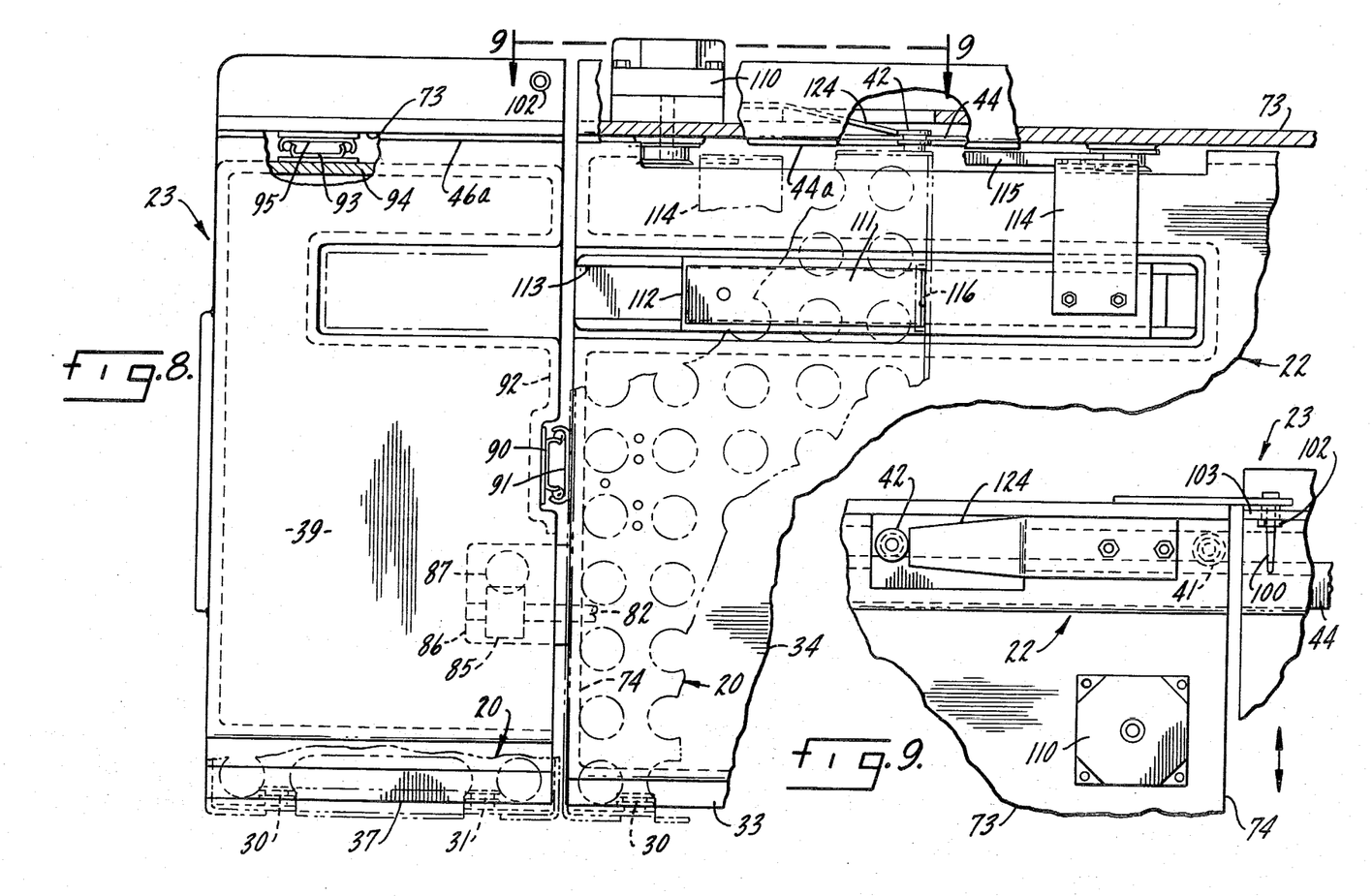
FIG. 8 is an enlarged section taken substantially along line 8—8 in FIG. 2 with fragments broken away to show the underlying structure.
FIG. 9 is an enlarged fragmentary rear elevation taken substantially along line 9—9 in FIG. 8.

When the elevators reach their raised positions, the top of the elevator platform 39 engages and actuates a limit switch LS2 (FIG. 2) connected to a drive motor 110 for an upper transfer arm 111 which transfers the pallet 20 from the left-hand elevator 23 onto the upper track 22. The structure of the upper transfer arm 111 and its drive system are identical to that of the lower transfer arm 60 described previously, except that the left-hand end, rather than the right-hand end, of the upper arm 111 is fixed to the movable member 112 of its ball slide (FIG. 8). Thus, the stationary member 113 of the ball slide is recessed in and attached to the upper track frame section 34 and carries a bracket 114 driven by the motor 110 via belt 115. As the arm 111 is driven to the left, it is cammed downwardly by a lug 116 punched out of the bottom of the pallet 20 in line with the leading side wall of pallet on the elevator 23 (it will be appreciated that the leading side of a pallet on the upper track 22 is opposite the leading side of a pallet on the lower track 21.) When the arm 111 clears the lug 116 it snaps up against the bottom of the pallet on the elevator 23 so that subsequent retraction of the arm 111 pushes the pallet from the elevator 23 onto the upper track 22.

Figures 2, 3:
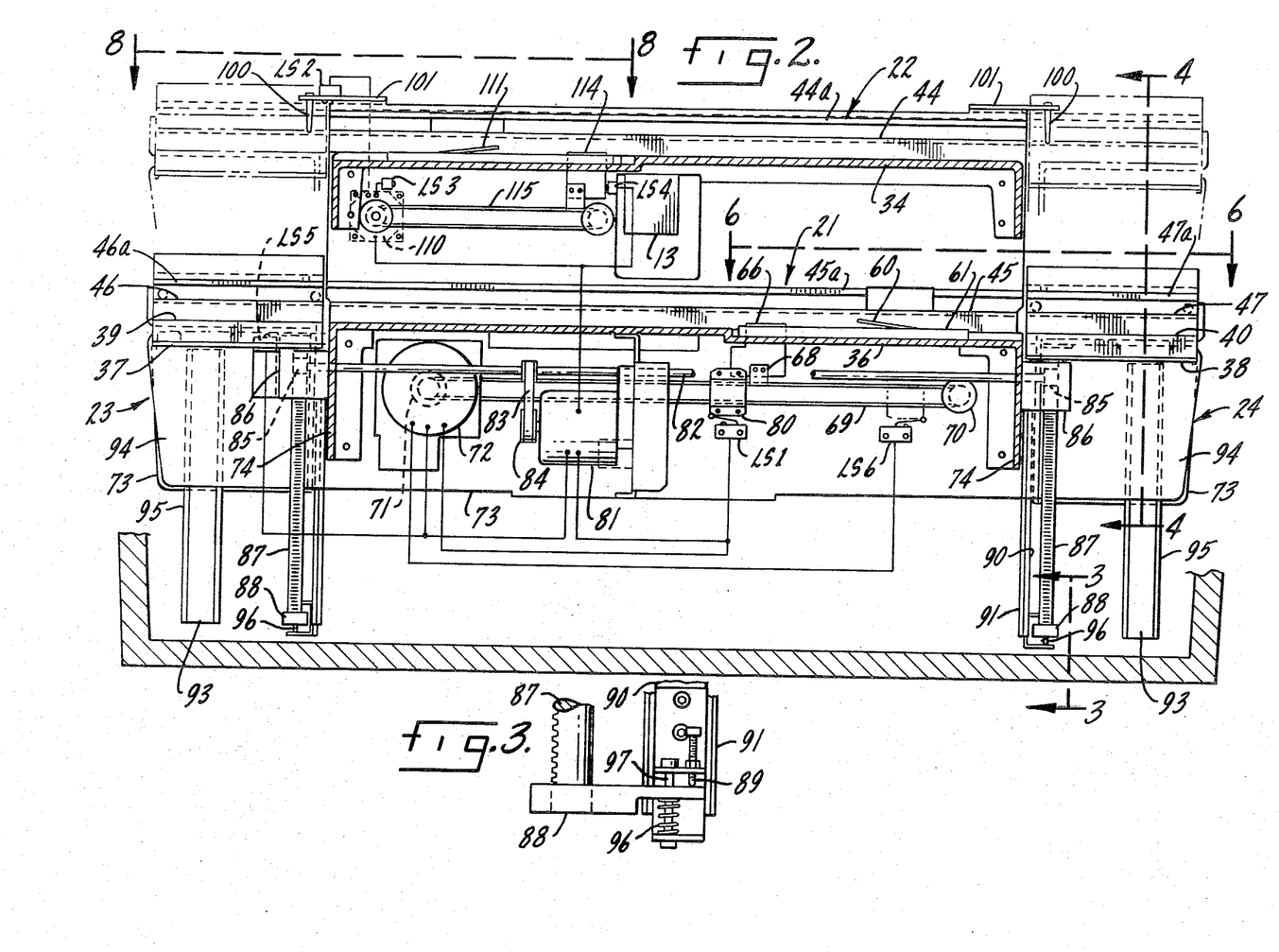
FIG. 2 is a front elevation, in partial section, of the spectrometer of FIG. 1 with the electrical connections between various switches and motors illustrated schematically.
FIG. 3 is an enlarged end elevation taken substantially along line 3—3 in FIG. 2.

While the elevators are being raised, the transfer arm 111 is in its retracted position, as illustrated in FIGS. 2 and 8. Upon actuation of the limit switch LS2 as the elevators reach their raised positions, the dirve motor 110 is energized to advance the transfer arm 111, to the left as viewed in FIG. 2, until the bracket 114 actuates a limit switch LS3. Actuation of the switch LS3 reverses the direction of the motor 110 so that the transfer arm 111 is immediately retracted, i.e., moved to the right as viewed in FIG. 2. As the arm 111 is retracted, the pallet on the elevator 23 is transferred to the upper track 22, thereby advancing all the pallets on the upper track by one tray width and transferring the leading pallet onto the platform 40 of the right-hand elevator 24.

In order to stop the retracting movement of the transfer arm 111 when the pallet engaged thereby has been removed from the left-hand elevator 23 and positioned at the left end of the upper track 22, a limit switch LS4 is positioned to be engaged and actuated by the bracket 114 when the transfer arm 111 has reached its retracted position. Actuation of the limit switch LS4 (1) de-energizes the drive motor 110 so that the transfer arm 111 is stopped at the retracted position and (2) reverses the direction of the elevator drive motor 81 so that both elevators are lowered, thereby transferring the pallet 20 on the right-hand elevator 24 from the upper track 21 to the lower track 21.

When the elevators 23 and 24 reach their lowered positions, where their platforms are aligned with the lower track 21, the bottom of the elevator platform 39 engages and actuates a limit switch LS5 which de-energizes the elevator drive motor 81. To ensure accurate vertical alignment of the elevator platforms with the plane of the lower track 21, both the pinion blocks 86 near the fronts of the elevators and the rear wall 73 of the stationary track frame at the rear of the machine are positioned to engage the bottoms of the elevator platforms when the elevators are in the desired lowered positions, i.e., in alignment with the plane of the lower track. Alignment of the elevator platforms in the horizontal plane is assured when the elevators are in their lower positions because the upper ends of the racks 87 are contained within the stationary pinion blocks 86. In the event that the racks 87 are not stopped precisely at the positive stop positions determined by the pinion blocks 86 and the rear wall of the track frame, the resulting overtravel of the brackets 88 carried on the lower ends of the racks 87 compresses coil springs 96 mounted on pins 97 carried by the movable slide members 90. The compressed springs 96 then bias the brackets 88 upwardly toward the pins 89 to automatically compensate for the rack overtravel.

The same limit switch LS5 that de-energizes the elevator drive motor 81 to stop the elevators in their lowered positions, also energizes the drive motor 72 for the lower transfer arm 60 to initiate advancement of the arm 60. As described previously, advancement of the arm 60 continues until the arm snaps past the depending lug 65 on the leading side of the tray pallet on the right-hand elevator 24. At this point, the actuator 80 engages and actuates a limit switch LS6 to reverse the direction of the drive motor 72, thereby retracting the transfer arm 60 to transfer the tray pallet on the elevator 24 from the elevator platform 40 to the lower track 21. The advancement of this tray pallet onto the lower track 21 also advances all the other tray pallets to the left along the lower track, thereby advancing the leading pallet onto the platform of the left-hand elevator 23. When the arm 60 is fully retracted, the actuator 80 actuates the limit switch LS1 again to de-energize the motor 72 and energize the elevator drive motor 81 as described previously. This begins another cycle, with the left-hand elevator 23 transferring a tray pallet 20 from the lower track 21 to the upper track 22 and the right-hand elevator 24 being positioned to receive another tray pallet from the upper track 22 for subsequent transfer to the lower track 21.

Figure 5:
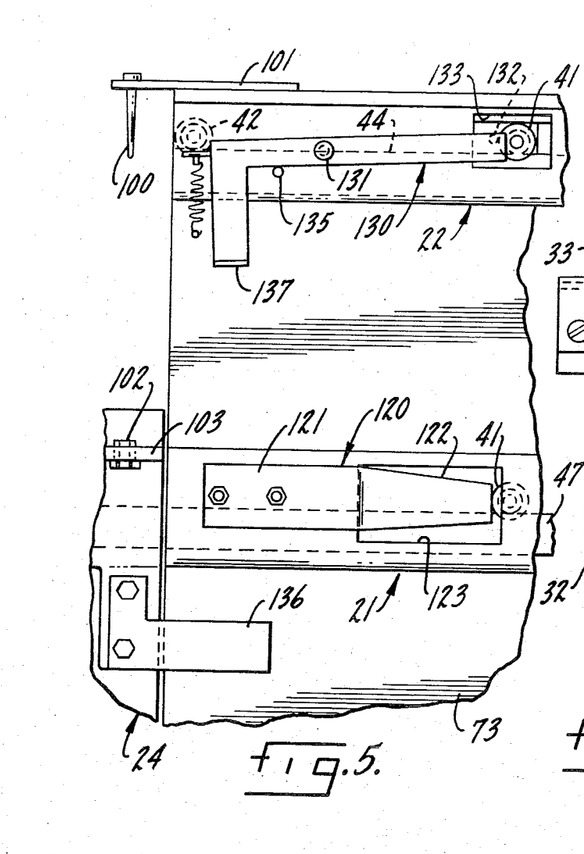
FIG. 5 is a fragmentary rear elevation taken substantially along line 5—5 in FIG. 4.
Figure 6:
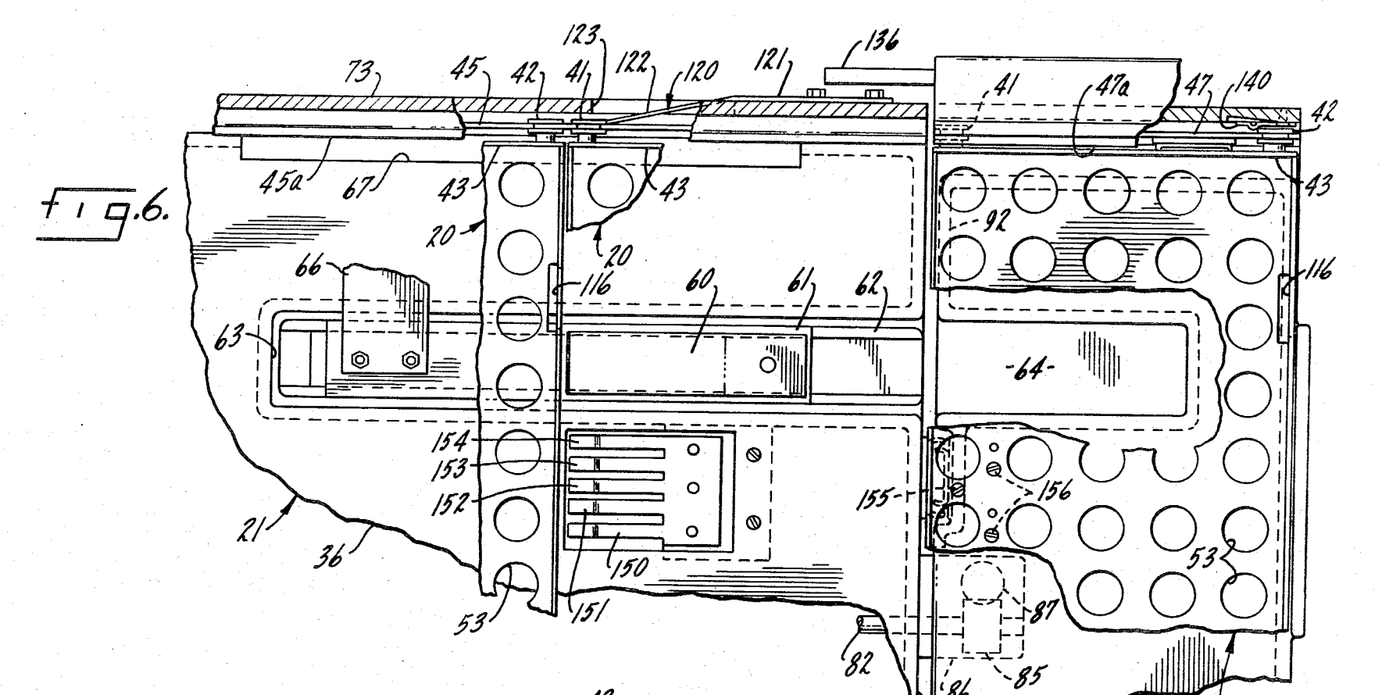
FIG. 6 is an enlarged section taken substantially along line 6—6 in FIG. 2 with fragments broken away to show the underlying structure.
Figure 7:
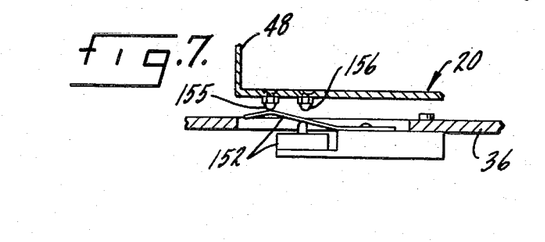
FIG. 7 is an enlarged fragmentary section showing the detail of one of the electrical switching arrangements included in the system of FIG. 1.

In accordance with one of the specific aspects of the present invention, latching means are provided at the entrance ends of both the upper and lower tracks 22 and 21 for holding the trailing pallet accurately in position on the tracks to avoid interference with the elevators as they are raised and lowered past the entrance ends of the tracks. The latches at the entrance ends of both tracks are identical, and thus only one of them will be described in detail. Thus, referring to FIGS. 4, 5 and 6, the latching device at the right-hand end of the lower track 21 comprises a spring plate 120 having a fixed end 121 secured to the rear side of the rear wall of the track frame and a movable end 122 projecting through a cut-out 123 in the frame. The movable end 122 of the spring plate 120 is biased forwardly toward the tray pallets 20 on the track 21 and is aligned with the centers of the rear rollers 41 and 42. Consequently, whenever a pallet 20 is advanced past the spring plate 120, the rollers 41 and 42 on the rear side of the pallet cam the plate 120 rearwardly with the plate 120 snapping back against the rail 47 each time it is cleared by one of the rollers. Thus when the first roller 41 on each pallet clears the plate 120, the plate presses against the track 47 on the trailing side of the roller 41 to prevent any reverse movement of the pallet. Accordingly, the spring plate 120 provides a uni-directional latch which permits the tray pallets 20 to be moved in the normal direction of pallet advancement on the adjacent track 21, but prevents any reverse movement of the pallets so that they cannot slip back past the entrance end of the track 21 to interfere with the raising and lowering of the adjacent elevator 24.

At the left-hand end of the upper track 22, a similar spring plate 124 (FIGS. 8 and 9) functions in the same manner as the plate 120 to prevent reverse movement of pallets 20 on the upper track 22.

In accordance with another specific aspect of the invention, a latch provided at the exit end of the upper track 22 is operated in response to raising and lowering movement of the right-hand elevator 24. Thus, as most clearly illustrated in FIGS. 4 and 5, the latch at the right-hand end of the upper track 22 comprises an L-shaped lever 130 which is pivoted at 131 on the rear side of the stationary track frame. In its normally closed position, illustrated in FIG. 5, a pin 132 on the lever 130 projects forwardly through a cutout 133 in the track frame to engage the leading side of the trailing roller 41 on the lead pallet at the exit end of the upper track, thereby preventing movement of the leading pallet past the edge of the upper track 22. The latch is normally held in this latched position by means of a spring 134 biasing the lever 130 in the counterclockwise direction against a stop pin 135.

As the elevator 24 is raised, a finger 136 carried by the elevator engages a horizontal flange 137 on the lower end of the lever 130 to pivot the lever in the clockwise direction about its pivot point, thereby swinging the latch pin 132 clear of the pallet rollers 41 and 42. The latch is held in this position as long as the elevator 24 is in its raised position, but as soon as the elevator is lowered the spring 134 pivots the lever 130 back to its latched position so that the new tray pallet 20 positioned at the right-hand end of the upper track 22 is latched against forward movement. As in the case of the spring latches described previously, this elevator-actuated latch is uni-directional, i.e., it only prevents advancing movement of the tray pallets toward the exit end of the track 22.

In order to hold the particular tray pallet carried by either elevator 23 or 24 in position on the elevator platform while the elevator is being raised or lowered, to prevent the pallet from catching on the adjacent ends of the adjacent tracks 21 and 22, a spring detent is provided on each elevator to prevent undesired rolling movement of the pallet on the elevator platform. Thus, as shown most clearly in FIG. 6, a spring detent 140 fastened to the elevator platform at the rear outboard corner thereof is retracted by the camming action of the pallet roller 42 as the pallet is advanced onto the right-hand elevator platform 40. When the pallet is in position on the elevator platform 40, the spring detent 140 snaps back past the edge of the roller 42 to prevent the pallet from moving back toward the open side of the tray platform. The spring detent 140 has sufficient force to hold the pallet in position until it is subjected to the positive transfer force of the transfer arm 60 at which time the roller 42 again cams the spring detent 140 to its retracted position to permit the pallet 20 to be transferred off the elevator platform. A similar spring detent is provided on the left-hand elevator 23.

In accordance with a further feature of the present invention, a bank of switches is provided upstream of the transfer station 13 for cooperating with different combinations of switch actuators on the nine pallets to generate electrical signals representing the particular pallet present at the transfer station at any given time. These electrical signals are used to correlate the data generated for each sample in the counting unit 15 with the location of that sample. Thus, as shown most clearly in FIG. 6, a bank of switches and switch actuators 150, 151, 153 and 154 is located in the first pallet position on the lower track 22. The middle switch 152 is a "cancel" switch actuated by a depending lug 155 provided near the leading edge of each tray pallet 20 to generate an electrical signal indicating that a new tray is about to be presented to the transfer station. Then as the pallet is indexed along the lower track 22, a second set of switch-actuating lugs 156 depending from the pallet actuate different combinations of the switches 150, 151, 153 and 154, according to a binary code, for example, to generate electrical signals representing the particular pallet that is present at the transfer station 13 at any given time. Since the bank of switches is located upstream of the transfer station, the lugs 156 on any given pallet are actually positioned to generate electrical signals representing the next preceeding pallet, which is the one that is actually entering the transfer station at the time the electrical signals are generated by actuation of the switches 150, 151, 153, and 154. That is, the lugs representing any given pallet are offset from that particular pallet by one pallet width.

As can be seen from the foregoing detailed description, this invention provides an improved tray storage and handling system which is capable of storing a number of sample vial trays each containing a large number of sample vials. This system is particularly useful in a liquid scintillation spectrometer, and permits the spectrometer to be shared by a number of different users. The tray handling system automatically advances the trays in sequence past a fixed transfer station, where the sample vials may be transferred out of the trays to a counting station for measuring the radioactivity of the individual samples, for example. The users of the system may simply place their trays of sample vials in the system at any desired time and then leave the trays unattended while they are automatically advanced in turn to the transfer station, with the trays dwelling while the sample vials are transferred out of the tray and then returned thereto. With the parallel conveyor system, with the elevators for transferring trays between the two conveyors, a relatively large tray capacity can be provided in a relatively small space. With the various safeguards provided to insure reliable operation, such as the positive alignment and stop devices, the system can be safely left unattended with the assurance that valuable test time will not be lost.

I claim as my invention:

1. Apparatus for conveying a plurality of trays of sample vials past a transfer station where successive transverse rows of vials are transferred from the tray to an operating station and then returned to the tray, said apparatus comprising the combination of a plurality of tray conveyors adapted to support a plurality of trays for movement along different paths, transfer means for transferring trays between said conveyors, means for indexing trays along a first one of said conveyors to align successive transverse rows of vials in the trays on said first conveyor with said transfer station, means responsive to the indexing of a complete tray past said transfer station for stopping the indexing of trays along said first conveyor and actuating said transfer means to transfer a tray from said first conveyor to a second conveyor, means responsive to the transfer of a tray from said first conveyor to said second conveyor for actuating said transfer means to transfer a tray off of said second conveyor, and means responsive to the transfer of a tray from said second conveyor to said first conveyor for actuating said indexing means to resume the indexing of trays along said first conveyor.

2. Apparatus as set forth in claim 1 wherein each of said conveyors comprises horizontal track means, and said trays are carried on a plurality of tray pallets guided and supported by said track means and said transfer means.

3. Apparatus as set forth in claim 2 which includes means for latching the tray pallet positioned at the entrance end of both the first and second conveyors so as to avoid interference with said transfer means.

4. Apparatus as set forth in claim 2 which includes a bank of switches for generating electrical signals representing the particular tray present at said transfer station at any given time, and means on said tray pallets for tripping different combinations of the switches in said bank as different tray pallets are indexed past said transfer station.

5. Apparatus as set forth in claim 2 wherein each of said transfer means comprises an elevator for moving said tray pallets from one of said conveyors to the other, and a reciprocating transfer arm having an advanced position where the arm engages a tray pallet on the elevator when the elevator is aligned with the conveyor to which the tray pallet is being transferred, and a retracted position where the arm positions the engaged tray on the conveyor to which the tray pallet is being transferred.

6. Apparatus as set forth in claim 5 wherein the movement of said transfer arm from said advanced position to said retracted position advances all the tray pallets on said conveyor by one tray position, thereby advancing a tray pallet from said conveyor onto the elevator at the opposite end of said conveyor from the end at which the tray pallets are received from the other elevator.

7. Apparatus as set forth in claim 5 which includes switch means responsive to movement of the transfer arm associated with said first conveyor to said retracted position for stopping movement of said transfer arm and energizing said elevators to move them from said first conveyor to said second conveyor, thereby moving a tray pallet from said first conveyor to said second conveyor.

8. Apparatus as set forth in claim 5 which includes switch means responsive to movement of said elevators from said first conveyor to said second conveyor for actuating the transfer arm associated with said second conveyor to move said transfer arm to its advanced position to engage the tray pallet on the elevator at the inlet end of said second conveyor, and then to its retracted position to move the engaged tray pallet onto said second conveyor while advancing all the other tray pallets on said second conveyor and advancing the lead pallet onto the elevator at the exit end of said second conveyor.

9. Apparatus as set forth in claim 5 which includes switch means responsive to movement of the transfer arm associated with said second conveyor to its retracted position for stopping movement of said transfer arm and energizing said elevators to move them from said second conveyor to said first conveyor, thereby moving a tray pallet from said second conveyor to said first conveyor.

10. Apparatus as set forth in claim 5 which includes switch means responsive to movement of said elevators from said second conveyor to said first conveyor for actuating the transfer arm associated with said first conveyor to move said transfer arm to its advanced position to engage the tray pallet on the elevator at the inlet end of said first conveyor, and then initiating the indexing movement of the engaged tray along said first conveyor while indexing all the other tray pallets on said first conveyor and advancing the lead pallet onto the elevator at the exit end of said first conveyor.

11. Apparatus as set forth in claim 5 which includes latching means for holding the tray pallet at the exit end of said second conveyor in position during the movement of said elevators, and means for releasing said latching means in response to movement of said elevators from said first conveyor to said second conveyor.

12. Apparatus as set forth in claim 5 which includes positive stop means for stopping said elevators in accurate alignment with said conveyors.

13. Apparatus as set forth in claim 5 which includes horizontal positioning means for automatically positioning said elevators in predetermined horizontal positions in response to movement of said elevators from one conveyor to another.

14. A method of conveying a plurality of trays of sample vials past a transfer station where successive transverse rows of vials are transferred from the tray to an operating station and then returned to the tray, said method comprising the steps of placing said trays on a plurality of tray conveyors adapted to support a plurality of trays for movement along substantially parallel paths, indexing the trays along a first one of said conveyors to align successive transverse rows of vials in the trays on said first conveyor with said transfer station, stopping the indexing of said trays along said first conveyor, and transferring a tray from said first conveyor to a second conveyor in response to the indexing of a complete tray past said transfer station; transferring a tray from said second conveyor onto said first conveyor in response to the transfer of a tray from said first conveyor to said second conveyor, and then resuming the indexing of trays along said first conveyor in response to the transfer of a tray from said second conveyor to said first conveyor.

15. A method as set forth in claim 14 wherein said trays are carried on tray pallets which are advanced along said conveyors regardless of whether a tray is present on any given pallet at any given time.

16. A method as set forth in claim 15 wherein said pallets are carried by two horizontal tracks, and said pallets are transferred between said tracks by a pair of elevators at opposite ends of the tracks.

17. A method as set forth in claim 16 wherein a pallet is transferred from said first conveyor onto a first one of said elevators each time a complete pallet is indexed past said transfer station, and said elevators are then moved from said first conveyor to said second conveyor.

18. A method as set forth in claim 17 wherein the pallet is transferred from said first elevator onto said second conveyor upon the arrival of said elevator at said second conveyor, and at the same time a pallet is transferred from said second conveyor to the second elevator.

19. A method as set forth in claim 18 wherein said elevators are moved from said second conveyor upon completion of the transfer of said pallet from second conveyor to said second elevator, and the pallet on said second elevator is transferred to said first conveyor upon the arrival of said elevators at said first conveyor.

20. Apparatus for conveying a plurality of trays of sample vials past a transfer station where successive transverse rows of vials are transferred from the tray to an operating station and then returned to the tray, said apparatus comprising the combination of a plurality of tray conveyors adapted to support a plurality of trays for movement along different paths, transfer means for transferring trays between said conveyors, means for indexing trays along a first one of said conveyors to align successive transverse rows of vials in the trays on said first conveyor with said transfer station, a plurality of tray pallets guided and supported by said conveyors and said transfer means, means responsive to the indexing of a complete tray past said transfer station for stopping the indexing of tray pallets along said first conveyor and actuating said transfer means to transfer a tray pallet from said first conveyor to a second conveyor, and means for latching the tray pallet positioned at the entrance end of both the first and second conveyors so as to avoid interference with said transfer means.

21. Apparatus for conveying a plurality of trays of sample vials past a transfer station where successive transverse rows of vials are transferred from the tray to an operating station and then returned to the tray, said apparatus comprising the combination of a plurality of tray conveyors adapted to support a plurality of trays for movement along differnet paths, transfer means for transferring trays between said conveyors, means for indexing trays along a first one of said conveyors to align successive transverse rows of vials in the trays on said first conveyor with said transfer station, a plurality of tray pallets guided and supported by said conveyor and said transfer means, means responsive to the indexing a complete tray past said transfer station for stopping the indexing of tray pallets along said first conveyor and actuating said transfer means to transfer a tray pallet from said first conveyor to a second conveyor, each of said transfer means comprising an elevator for moving said tray pallets from one of said conveyors to the other, a reciprocating transfer arm having an advanced position where the arm engages a tray pallet on the elevator when the elevator is aligned with the conveyor to which the tray pallet is being transferred, and a retracted position where the arm positions the engaged tray on the conveyor to which the tray pallet is being transferred, latching means for holding the tray pallet at the exit end of said second conveyor in position during the movement of said elevators, and means in response to movement of said elevators from said first conveyor to said second conveyor.

22. Apparatus for conveying a plurality of trays of sample vials past a transfer station where successive transverse rows of vials are transferred from the tray to an operating station and then returned to the tray, said apparatus comprising the combination of a plurality of tray conveyors adapted to support a plurality of trays for movement along different paths, transfer means for transferring trays between said conveyors, means for indexing trays along a first one of said conveyors to align successive transverse rows of vials in the trays on said first conveyor with said transfer station, a plurality of tray pallets guided and supported by said conveyors and said transfer means, means responsive to the indexing of a complete tray past said transfer station for stopping the indexing of tray pallets along said first conveyor and actuating said transfer means to transfer a tray pallet from said first conveyor to a second conveyor, a bank of switches for generating electrical signals representing the particular tray present at said transfer station at any given time, and means on said tray pallets for tripping different combinations of the switches in said bank as different tray pallets are indexed past said transfer station.

23. A method of conveying a plurality of trays of sample vials past a transfer station where successive transverse rows of vials are transferred from the tray to an operating station and then returned to the tray, said method comprising the steps of placing $n$ (wherein $n$ is any whole integer) trays on each of $m$ (wherein $m$ is any whole integer) tray conveyors each of which is adapted to support $n$ trays for movement along substantially parallel paths, placing an additional tray on a first transfer means for transferring trays between said conveyors so that a total of $(n \times m) + 1$ trays are held by said conveyors and transfer means; advancing said additional tray from said transfer means onto a first one of said conveyors so as to index the $n$ trays along said first conveyor to align successive transverse rows of vials in the trays on said first conveyor with said transfer station while advancing a tray from said first conveyor onto a second transfer means for transferring trays between said conveyors; stopping the indexing of said trays along said first conveyor each time a complete tray is indexed past said transfer station; transferring the tray on said second transfer means from said first conveyor to a second conveyor, and advancing said tray from said second transfer means onto said second conveyor so as to move the trays along said second conveyor and advance a new tray from said second conveyor onto said first transfer means; and transferring the new tray on said first transfer means from said second conveyor to said first conveyor and advancing said new tray from said first transfer means onto said first conveyor to resume the indexing of trays along said first conveyor.

* * * * *